(12) United States Patent
Zu et al.

(10) Patent No.: US 11,133,735 B2
(45) Date of Patent: Sep. 28, 2021

(54) LINEAR VIBRATION MOTOR

(71) Applicant: GOERTEK INC., WeiFang (CN)

(72) Inventors: Fenglei Zu, WeiFang (CN); Chunfa Liu, WeiFang (CN)

(73) Assignee: GOERTEK INC., WeiFang (CN)

( * ) Notice: Subject to any disclaimer, the term of this patent is extended or adjusted under 35 U.S.C. 154(b) by 550 days.

(21) Appl. No.: 16/075,560

(22) PCT Filed: May 18, 2016

(86) PCT No.: PCT/CN2016/082479
§ 371 (c)(1),
(2) Date: Aug. 3, 2018

(87) PCT Pub. No.: WO2017/133132
PCT Pub. Date: Aug. 10, 2017

(65) Prior Publication Data
US 2019/0052161 A1    Feb. 14, 2019

(30) Foreign Application Priority Data
Feb. 5, 2016  (CN) .......................... 201610082381.1

(51) Int. Cl.
*H02K 33/16* (2006.01)
(52) U.S. Cl.
CPC .................................. *H02K 33/16* (2013.01)
(58) Field of Classification Search
CPC ........ H02K 33/16; H02K 33/02; H02K 33/14; H02K 33/18; H02K 33/06; H02K 33/00;
(Continued)

(56) References Cited

U.S. PATENT DOCUMENTS

| | | | |
|---|---|---|---|
| 2011/0210686 A1* | 9/2011 | Sengchanh | H02K 41/031 318/135 |
| 2011/0309691 A1* | 12/2011 | Park | H02K 33/16 310/25 |
| 2014/0159511 A1* | 6/2014 | Park | B06B 1/045 310/12.16 |

FOREIGN PATENT DOCUMENTS

| CN | 101183823 A | 5/2008 |
|---|---|---|
| CN | 102570764 A | 7/2012 |

(Continued)

OTHER PUBLICATIONS

International Search Report for PCT/CN2016/082479 filed on May 18, 2016.

*Primary Examiner* — Bryan R Perez

(57) ABSTRACT

The vibrator comprises a vibration block, and the vibration block comprises at least one permanent magnet, the stator comprises conductive blocks, and the conductive blocks are subjected to the effect of a magnetic field force which is the same as and/or opposite to the vibration direction of the vibrator. When the vibrator is in a balanced state, the resultant force of the magnetic field force is zero. When the magnetic conductive blocks are subjected to the effect of an excitation force to perform a relative displacement relative to the vibrator in the vibration direction of the vibrator, a direction of the resultant force of the magnetic field forces is the same as the direction of the relative displacement, a magnitude of the resultant force of the magnetic field forces has a proportional relationship with a magnitude of the relative displacement. The conductive blocks are used to replace the stator coils.

10 Claims, 11 Drawing Sheets

(58) Field of Classification Search
CPC ........ H02K 35/02; H02K 7/061; H02K 7/065;
H02K 7/025; H02K 1/34; H02K 5/046;
H02K 5/04; H02K 2203/15; H02K 37/10;
H02K 41/025; H02K 41/03; H02K
41/0354; H02K 7/08; H02K 7/14
See application file for complete search history.

(56) References Cited

FOREIGN PATENT DOCUMENTS

| | | |
|---|---|---|
| CN | 204967588 U | 1/2016 |
| CN | 105529898 A | 4/2016 |
| CN | 205490071 U | 8/2016 |
| JP | 2002-300795 A | 10/2002 |
| KR | 10-2011-0049385 A | 5/2011 |

* cited by examiner

LINEAR VIBRATION MOTOR

CROSS-REFERENCE TO RELATED APPLICATIONS

The present specification is a U.S. National Stage of International Patent Application No. PCT/CN2016/082479 filed May 18, 2016, which claims priority to and the benefit of Chinese Patent Application No. 201610082381.1 filed in the Chinese Intellectual Property Office on Feb. 5, 2016, the entire contents of which are incorporated herein by reference.

TECHNICAL FIELD

The present invention relates to the technical field of consumer electronics, and more specifically, to a linear vibration motor applied to portable consumer electronic products.

BACKGROUND ART

With the development of communication technology, portable electronic products, such as mobile phones, handheld games players, or handheld multimedia entertainment apparatus, etc., have entered people's lives. In these portable electronic products, micro vibration motors are generally used for providing system feedback, such as call prompts of mobile phones, vibration feedback of game players and the like. However, with lightening and thinning development tendency of electronic products, various internal components of the electronic products also need to adapt to this tendency, and so is micro vibration motor.

The existing micro vibration motor generally includes an upper cover, a lower cover that forms a vibration space with the upper cover, a vibrator (including a counterweight block and a permanent magnet) that vibrates linearly and reciprocally in the vibration space, an elastic support component that connects to the upper cover and makes the vibrator to perform reciprocal vibration, and a stator coil positioned at a distance below the vibrator.

In the micro vibration motor with the above structure, the force for driving the vibrator to vibrate is only provided by the magnetic field force between the vibrator and the stator coil. Due to the change of the position of the vibrator relative to the stator coil during the vibration of the vibrator and the change of the magnitude and direction of the current passing through the stator coil, the force applied to the vibrator is changed, resulting in a non-linear change in the vibration of the vibrator, which affects the vibration sense balance of the electronic product. In addition, the existing micro vibration motor utilizes the resonance principle, which uses a small magnetic field driving force to drive a vibrator with higher mass to make it to resonate, so as to achieve a greater vibration sense. However, under such a driving mode, it will inevitably lead to slow response of the system.

SUMMARY

In view of the above problems, the purpose of the present invention is to provide a linear vibration motor which replaces the stator coil with the magnetic conductive block, and makes the product can easily obtain greater vibration sense during the free vibration process by the self-driving effect between the magnetic conductive block and the permanent magnet, and shortens the starting time of the system by the self-driving operating mode.

The present invention provides a linear vibration motor, comprising: a housing, a vibrator, and a stator fixed on the housing and arranged parallel to the vibrator, wherein the vibrator comprises a vibration block, and the vibration block comprises at least one permanent magnet, and the stator comprises magnetic conductive blocks; the magnetic conductive blocks are subjected to an effect of magnetic field forces which are in a same and/or opposite direction of a vibration direction of the vibrator; wherein when the vibrator is in a balanced state, a resultant force of the magnetic field forces is zero; when the magnetic conductive blocks are subjected to an effect of an excitation force to perform a relative displacement relative to the vibrator in the vibration direction of the vibrator, a direction of the resultant force of the magnetic field forces is the same as a direction of the relative displacement, and a magnitude of the resultant force of the magnetic field forces has a proportional relationship with a magnitude of the relative displacement.

Wherein, a preferred technical solution is that, the magnetic conductive blocks are distributed symmetrically or asymmetrically on upper side and lower side of the vibration block or the magnetic conductive blocks are disposed on one side of the vibration block.

Wherein, a preferred technical solution is that, the vibration block comprises three permanent magnets disposed adjacent to each other; each of the three permanent magnets disposed adjacent to each other is magnetized horizontally, and polarities of adjacent ends of adjacent permanent magnets are the same; the magnetic conductive blocks comprise two magnetic conductive blocks, and the magnetic conductive blocks are disposed symmetrically on the upper side and the lower side of the vibration block; and both of the two magnetic conductive blocks are symmetrically disposed in correspondence to a middle permanent magnet of the vibration block.

Wherein, a preferred technical solution is that, the vibration block comprises one permanent magnet, and the magnetic conductive blocks comprise two magnetic conductive blocks, both of which are disposed on upper side or lower side of the vibration block; and the two magnetic conductive blocks are distributed in correspondence to a left end and a right end of the permanent magnet respectively, and are symmetrical with respect to a central axis of the permanent magnet.

Wherein, a preferred technical solution is that, the vibration block comprises three permanent magnets disposed adjacent to each other, each of the three permanent magnets is magnetized horizontally, and polarities of adjacent ends of adjacent permanent magnets are the same; the magnetic conductive blocks comprise six magnetic conductive blocks, and the magnetic conductive blocks are disposed symmetrically on upper side and lower side of the three permanent magnets disposed adjacent to each other, respectively.

Wherein, a preferred technical solution is that, the vibration block comprises three permanent magnets disposed adjacent to each other, each of the three permanent magnets is magnetized horizontally, and polarities of adjacent ends of adjacent permanent magnets are the same; the magnetic conductive blocks comprise two magnetic conductive blocks, and the two magnetic conductive blocks are disposed asymmetrically on the upper side and the lower side of the vibration block; and the magnetic conductive blocks disposed asymmetrically on the upper side and the lower side of the vibration block are symmetrical with respect to a center of the vibration block.

Wherein, a preferred technical solution is that, a cross section of each of the magnetic conductive blocks has a U shape; and two ends of the magnetic conductive blocks corresponding to the permanent magnet are provided with extension parts for magnetism gathering.

Wherein, a preferred technical solution is that, a magnetic gap is formed between the magnetic conductive blocks and a corresponding permanent magnet of the vibration block; and magnetic liquid is disposed in the magnetic gap.

Wherein, a preferred technical solution is that, the external excitation force applied to the magnetic conductive block is generated by an excitation force generating component; and the excitation force generating component has a push-pull structure disposed symmetrically on left side and right side of the vibration block.

Wherein, a preferred technical solution is that, the linear vibration motor further comprises a mass block, the push-pull structure comprises a push-pull magnet, and a voice coil disposed on one side or upper side and lower side of the push-pull magnet; and both of the vibration block and the push-pull magnet are disposed in grooves positioned in the middle of the mass block.

The above linear vibration motor according to the present invention gets out from the prior motor design concept in which the motor is driven only by the magnetic force of the vibrator and the coil, and the linear vibration motor according to the present invention adopts a magnetic conductive block to replace the stator coil, so that the purpose of the self-driving can be achieved by the interaction between the magnetic conductive block and the permanent magnet completely during the vibration process, furthermore, when the linear vibration motor according to the present invention is in a free vibration state, as long as the self-driving force of this part is large enough, it can easily obtain a greater vibration sense, in addition, compared to the resonant operating principle of the prior art, the starting time required for system can be greatly shortened by the above self-driving operating mode.

In order to achieve the above and related purposes, one or more aspects of the present invention include features which will be specifically described below and particularly depicted in claims. The following description and the accompanying drawings set forth in detail certain illustrative aspects of the present invention. However, these aspects are only some of the various implementations to implement the principle of the present invention. In addition, the present invention is intended to include all such aspects and their equivalents.

BRIEF DESCRIPTION OF THE DRAWINGS

Other objects and results of the present invention will be more clearly understood by reading the following description in combination with the accompanying drawings and the contents of claims, and with a further comprehensive understanding of the present invention. In the drawings:

The same reference numbers indicate similar or corresponding features or functions throughout the accompanying drawings.

DETAILED DESCRIPTION OF EMBODIMENTS

In the following description, for the purposes of explanation, specific details are described so as to provide a full understanding of one or more embodiments. However, it will be apparent that these embodiments may also be practiced without these specific details. In other examples, in order to facilitate describing one or more embodiments, well-known structures and devices are shown in form of block.

The term "mass block" in the following description of specific embodiments may also be referred to as "counterweight block", and both of them refer to a high mass and high density metal block which is fixed to a vibration block generating vibration so as to enhance vibration balance.

In addition, the present invention is mainly focus on the improvement of the micro vibration motor, but it does not exclude applying technology disclosed in the present invention to the large vibration motor. However, in order to facilitate describing, in the following description of the embodiments, "the linear vibration motor" and "the micro vibration motor" refer to the same thing.

Specific embodiments of the present invention will be described in detail below with reference to the accompanying drawings.

In order to solve the problem of unbalanced vibration sense induced due to an unbalanced driving force provided by the magnet of the vibrator and the stator coil in the existing micro vibration motor structure, the linear vibration motor provided by the present invention replaces the stator coil with the magnetic conductive block, overcomes the problem of the uneven subjected force of the stator coil due to the change in the direction of electric conduction and the instability of the current magnitude, and effectively enhances the vibration sensor balance of the micro vibration motor.

The First Embodiment

Figure 1:
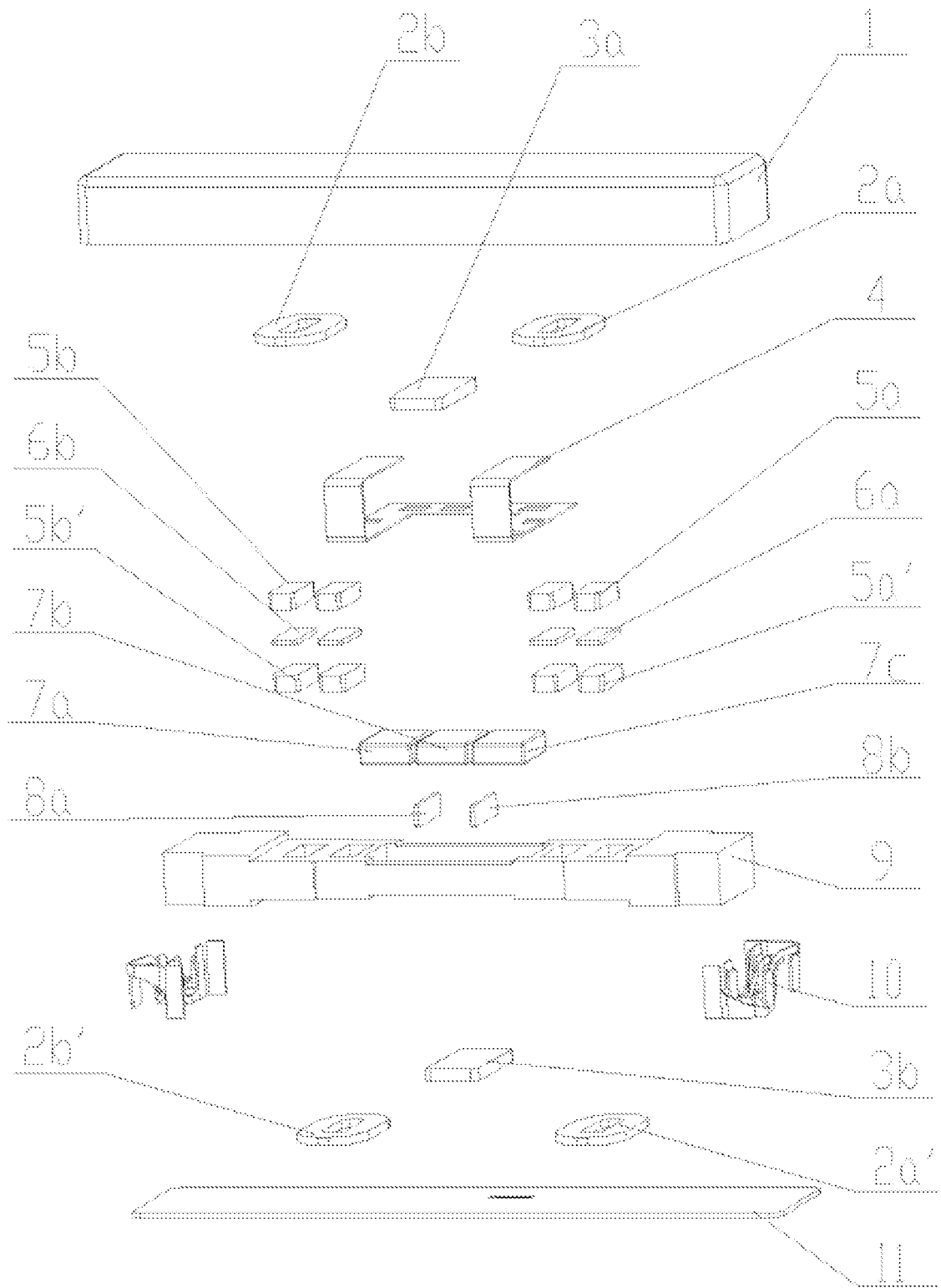
FIG. 1 illustrates a schematic diagram of an exploded structure of a linear vibration motor according to the first embodiment of the present invention.
Figure 2:
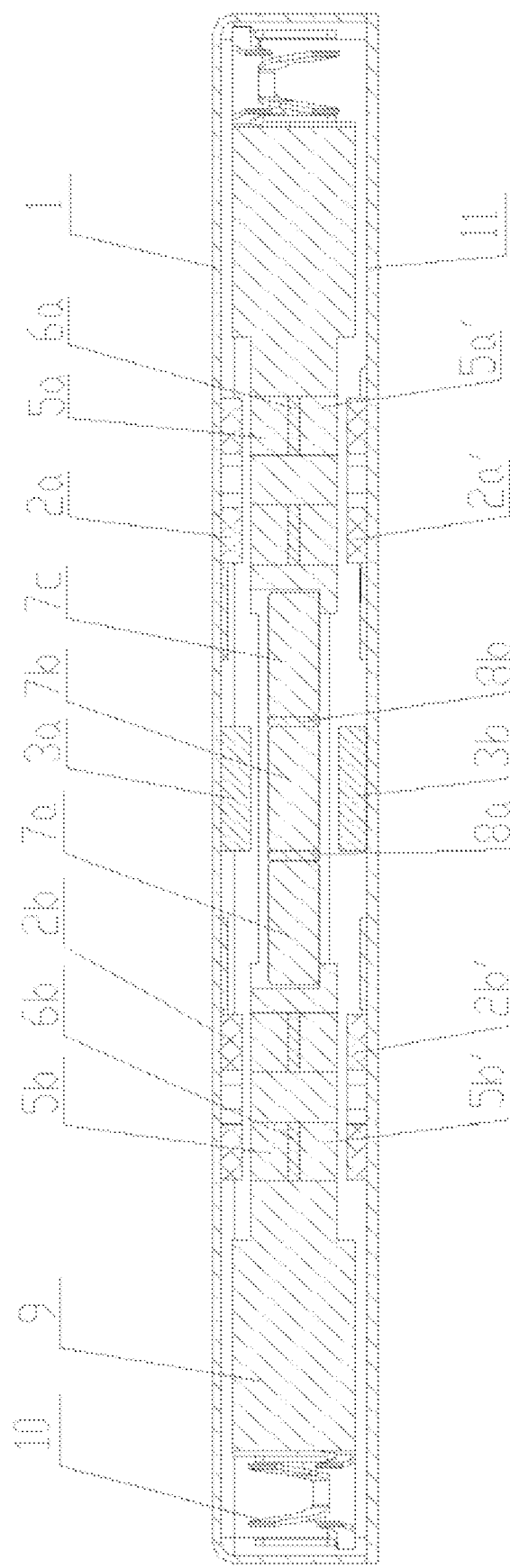
FIG. 2 illustrates a schematic diagram of a sectional structure of the linear vibration motor according to the first embodiment of the present invention.

FIG. 1 illustrates an exploded structure of a linear vibration motor according to the first embodiment of the present invention; FIG. 2 illustrates a sectional structure of the linear vibration motor according to the first embodiment of the present invention.

As shown in FIG. 1 and FIG. 2, the linear vibration motor provided by the present invention includes a housing, a vibrator, and a stator fixed on the housing and arranged parallel to the vibrator, wherein the vibrator includes a mass block 9 and a central vibration block (or a vibration block, similarly hereinafter) provided in the middle of the mass block 9, and the central vibration block comprises at least one permanent magnet; the stator includes magnetic conductive blocks 3a and 3b fixed on the housing, and the magnetic conductive blocks 3a and 3b are subjected to the effect of magnetic field forces which are in a same and/or opposite direction of the vibration direction of the vibrator in the vibration direction of the vibrator; wherein when the vibrator is in a balanced state, a resultant force of the magnetic field forces is zero; when the conductive blocks 3a and 3b are subjected to an effect of an excitation force to perform a relative displacement relative to the vibrator in the vibration direction of the vibrator, a direction of the resultant force of the magnetic field forces is the same as a direction of the relative displacement, and a magnitude of the resultant force of the magnetic field forces has a proportional relationship with a magnitude of the relative displacement.

Wherein, the housing comprises an upper housing 1 having a cuboid structure and a lower housing 11 having plate-shaped structure which is adapted, connected and fixed to the upper housing 1.

It should be noted that the vibration block can be provided in a variety of forms such as one permanent magnet or two permanent magnets. In the case where the vibration block is configured to comprise a plurality of permanent magnets, the magnetic conductive blocks can be distributed symmetrically or asymmetrically on the upper side and the lower side of the vibration block, or the magnetic conductive blocks can be provided on one side of the vibration block, and all improvements made without departing from the contents of the present invention are within the scope of protection of the present invention.

For example, the vibration block comprises three permanent magnets disposed adjacent to each other, and the three permanent magnets are magnetized horizontally, and polarities of adjacent ends of adjacent permanent magnets are the same; the magnetic conductive blocks comprise two magnetic conductive blocks, and the magnetic conductive blocks are disposed symmetrically on the upper side and the lower side of the vibration block; and both of the two magnetic conductive blocks are disposed in correspondence to a middle permanent magnet of the vibration block.

Alternatively, the vibration block includes one permanent magnet, the magnetic conductive blocks comprise two magnetic conductive blocks, both of which are disposed on upper side or lower side of the vibration block; Specifically, the two magnetic conductive blocks are distributed in correspondence to a left end and a right end of the permanent magnet respectively, and are symmetrical with respect to a central axis of the permanent magnet.

Alternatively, the vibration block comprises three permanent magnets disposed adjacent to each other, each of the three permanent magnets is magnetized horizontally, and polarities of adjacent ends of adjacent permanent magnets are the same; the magnetic conductive blocks comprise six magnetic conductive blocks, and the six magnetic conductive blocks are disposed symmetrically on upper side and lower side of the three permanent magnets disposed adjacent to each other, respectively.

Alternatively, the vibration block comprises three permanent magnets disposed adjacent to each other, each of the three permanent magnets disposed adjacent to each other is magnetized horizontally, and polarities of adjacent ends of adjacent permanent magnets are the same; the magnetic conductive blocks comprise two magnetic conductive blocks, and the two magnetic conductive blocks are disposed asymmetrically on the upper side and the lower side of the vibration block; and the magnetic conductive blocks disposed asymmetrically on the upper side and the lower side of the vibration block are symmetrical with respect to a center of the vibration block.

In the embodiment shown in FIG. 1, the central vibration block comprises three permanent magnets disposed adjacent to each other and magnetized horizontally, and polarities of adjacent ends of adjacent permanent magnets are the same, and the magnetic conductive blocks have sheet-shaped structures and are provided on the upper side and the lower side of the middle permanent magnet of the central vibration block and are symmetrical with respect to the center of the central vibration block.

In other words, the central vibration block comprises a first permanent magnet 7a, a second permanent magnet 7b and a third permanent magnet 7c arranged in sequence, and a first magnetic conductive yoke 8a is arranged between the first permanent magnet 7a and the second permanent magnet 7b, and a second magnetic conductive yoke 8b is provided between the second permanent magnet 7b and the third permanent magnet 7c, the first magnetic conductive block 3a is provided on the upper side of the second permanent magnet 7b, and the second magnetic conductive block 3b is provided on the lower side of the second permanent magnet 7b; both of the first magnetic conductive block 3a and the second magnetic conductive block 3b are fixed on the housing, and there is a certain gap between the second permanent magnet 7b and the first and second magnetic conductive blocks 3a and 3b. Wherein the first magnetic conductive block 3a and the second magnetic conductive block 3b are symmetrical distribution with respect to the second permanent magnet 7b, and when the vibrator is in a balanced static state, the distances between the first and second magnetic conductive blocks 3a and 3b and the ends of the first permanent magnet 7a and the third permanent magnet 7c are the same.

Figure 3A:
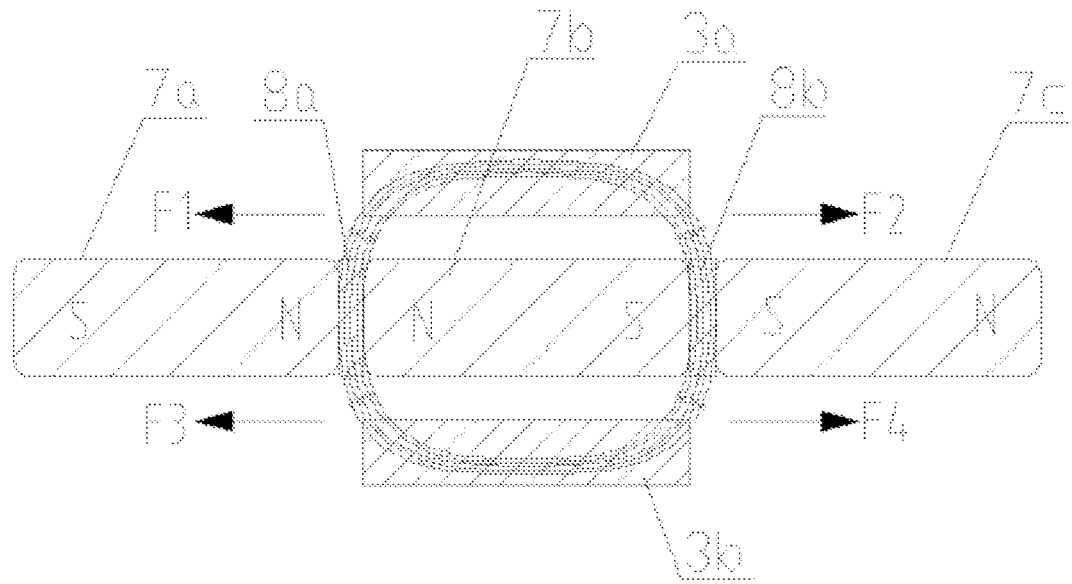
FIG. 3A illustrates a schematic diagram I of the principle of the linear vibration motor according to the first embodiment of the present invention.
Figure 3B:
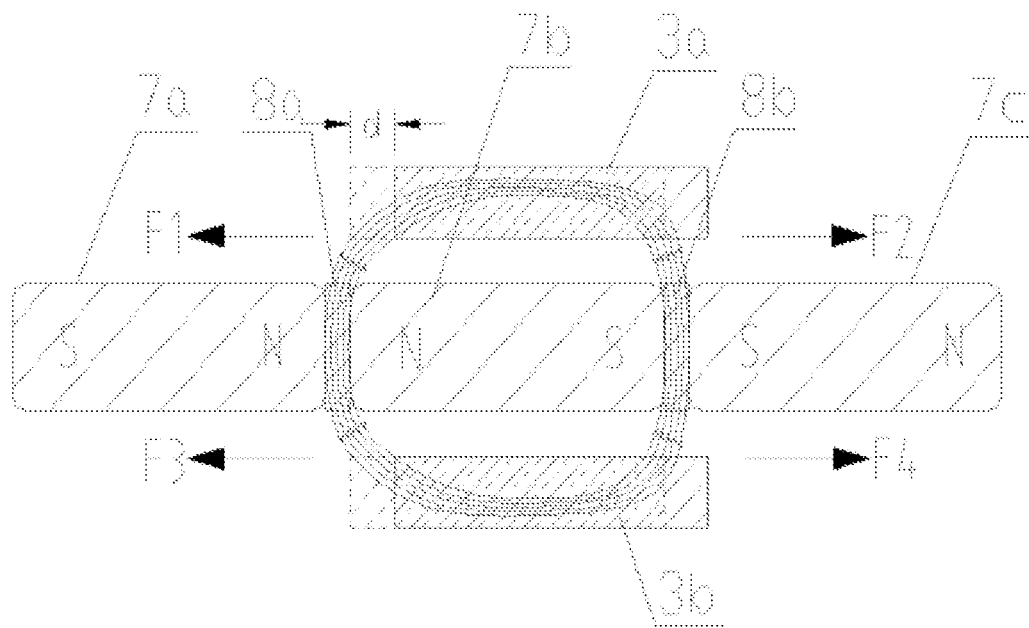
FIG. 3B illustrates a schematic diagram II of the principle of the linear vibration motor according to the first embodiment of the present invention.

FIG. 3A and FIG. 3B respectively illustrate the principle and structure of the static state and vibration state of the linear vibration motor according to the first embodiment of the present invention.

As shown in FIG. 3A and FIG. 3B, when the vibrator is in a balanced state, the first magnetic conductive block 3a is subjected to two magnetic forces F1 and F2 which have the same magnitudes and opposite directions; when the first magnetic conductive block 3a is subjected to an excitation force to perform a rightward relative displacement 'd' relative to the vibrator (including the permanent magnets 7a, 7b, 7C, and the magnetic conductive yokes 8a, 8b provided between adjacent permanent magnets) in the vibration direction of the vibrator, the magnetic force F1 to which the first magnetic conductive block 3a is subjected is less than F2, that is to say, when the displacement of the first magnetic conductive block 3a (here, since the magnetic conductive block is fixed on the housing, the displacement is relative displacement between the magnetic conductive block and the permanent magnet) is changed to 'd', the magnetic force to which the first magnetic conductive block 3a is subjected is dF=F2−F1=Kd>0, wherein K is the proportional coefficient of the magnetic force supplied to the magnetic conductive block, and K is related to the sizes of the magnetic conductive block and the permanent magnet and the position between the magnetic conductive block and the permanent magnet, similarly, the magnetic force to which the second magnetic conductive block 3b is subjected is dF=F4−F3=Kd>0, the vibration block is driven to vibrate in the direction parallel to the plane on which the magnetic conductive block is located, under the interaction of the first magnetic conductive block 3a and the second magnetic conductive block 3b.

It is known that when the conductive blocks perform a relative displacement with relative to the vibrator in the vibration direction of the vibrator, a direction of the resultant force of the two magnetic field forces is the same as a direction of the relative displacement of the conductive blocks, and a magnitude of the resultant force of the two magnetic field forces has a proportional relationship with a magnitude of the relative displacement, so as to achieve an inverse stiffness change of the magnetic conductive blocks to ensure the resonance of the vibrator, and the effect of vibration sense is more obvious.

The Second Embodiment

Figure 4:
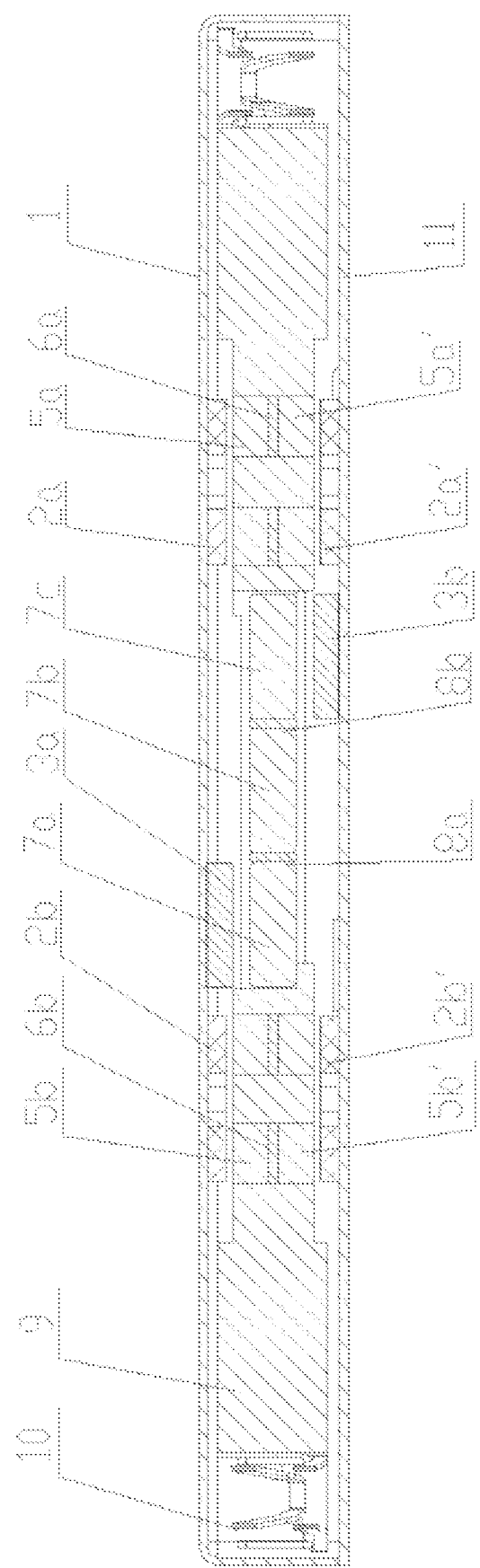
FIG. 4 illustrates a schematic diagram of a sectional structure of a linear vibration motor according to the second embodiment of the present invention.
Figure 5A:
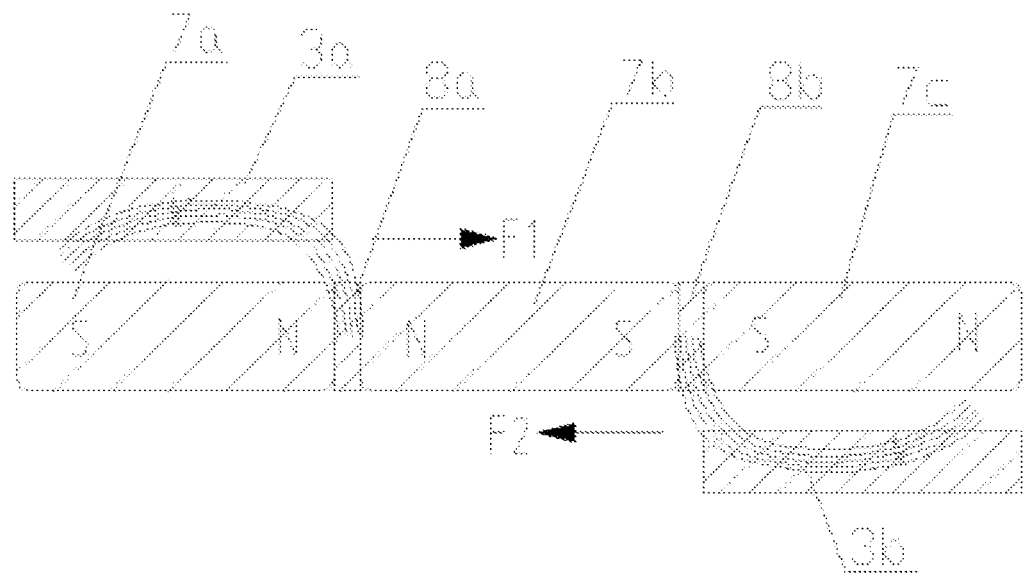
FIG. 5A illustrates a schematic diagram I of the principle of the linear vibration motor according to the second embodiment of the present invention.
Figure 5B:
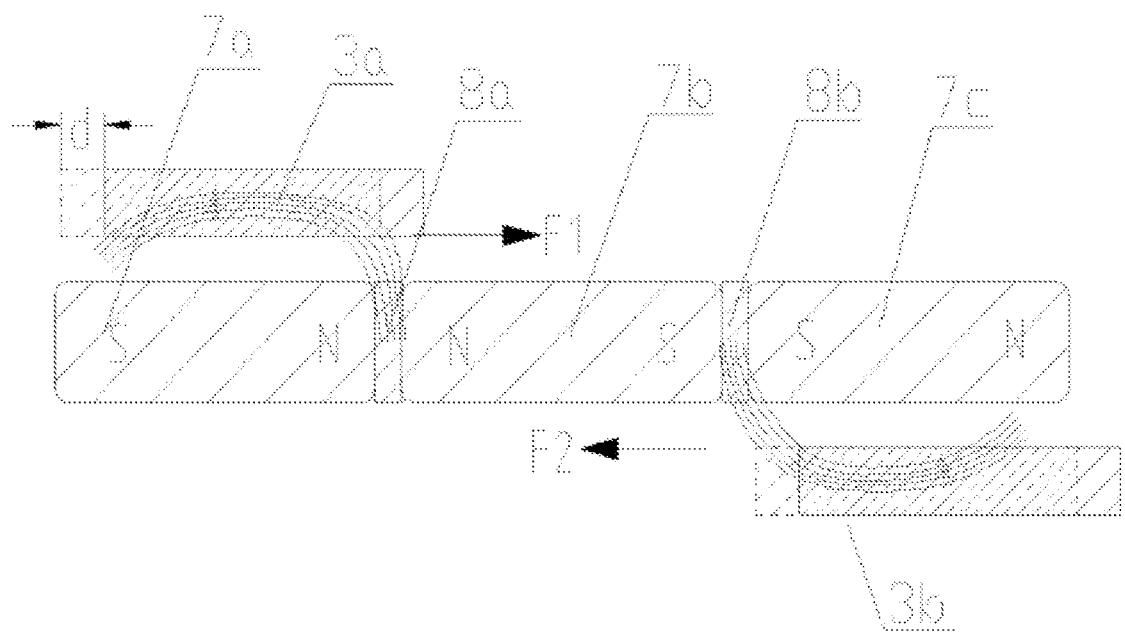
FIG. 5B illustrates a schematic diagram II of the principle of the linear vibration motor according to the second embodiment of the present invention.

FIG. 4 is a sectional structure of a linear vibration motor according to the second embodiment of the present invention; FIGS. 5A and 5B are the principle and structure of the static state and vibration state of the linear vibration motor according to the second embodiment of the present invention, respectively.

In the second embodiment shown in FIGS. 4 to 5B, the magnetic conductive blocks are asymmetrically arranged on the upper side and the lower side of the central vibration block, and the magnetic conductive blocks asymmetrically arranged on the upper side and the lower side of the central vibration block are symmetrical with respect to a center of the central vibration block.

Wherein the central vibration block comprises a first permanent magnet 7a, a second permanent magnet 7b and a third permanent magnet 7c disposed adjacent to each other, and each of the three permanent magnets disposed adjacent to each other is magnetized horizontally, and polarities of adjacent ends of adjacent permanent magnets are the same; the magnetic conductive blocks comprise two magnetic conductive blocks, and the two magnetic conductive blocks are disposed asymmetrically with respect to the horizontal direction of the permanent magnet. For example, the first magnetic conductive block 3a is provided at the upper side of the first permanent magnet 7a, and the second magnetic conductive block 3b is provided at the lower side of the third permanent magnet 7c; alternatively, the first magnetic conductive block is provided at the upper side of the third permanent magnet, and the second magnetic conductive block is provided at the lower side of the first permanent magnet; wherein the first magnetic conductive block and the second magnetic conductive block are distributed in a manner of central symmetrical with respect to a center of the second permanent magnet.

Wherein a first magnetic conductive yoke 8a is arranged between the first permanent magnet 7a and the second permanent magnet 7b, and a second magnetic conductive yoke 8b is arranged between the second permanent magnet 7b and the third permanent magnet 7c.

The Third Embodiment

Figure 6:
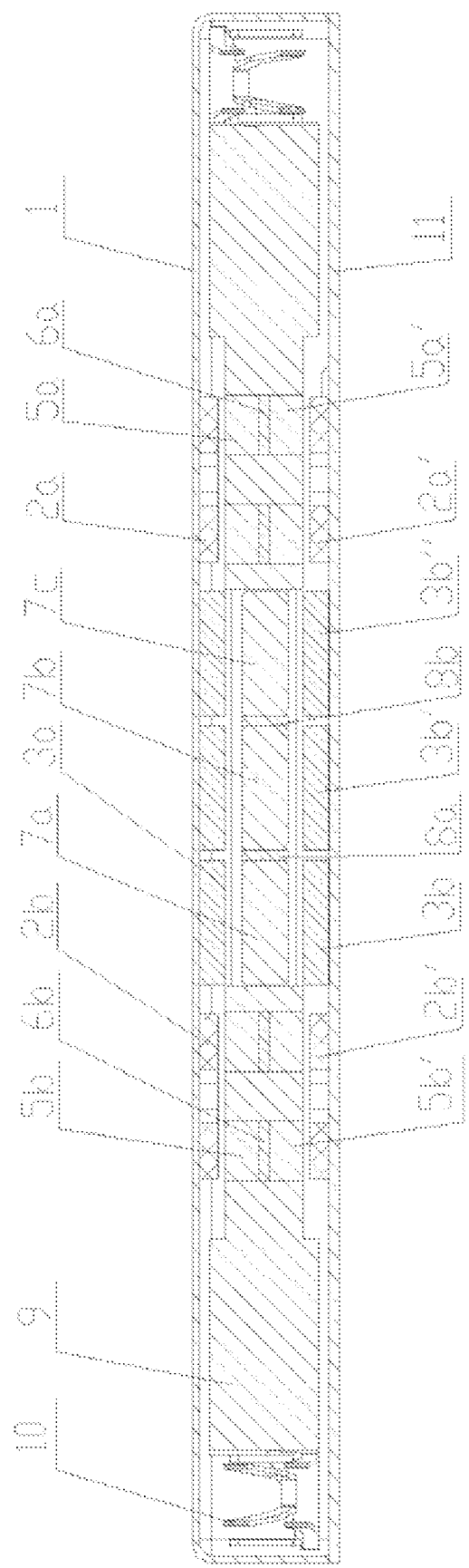
FIG. 6 illustrates a schematic diagram of a sectional structure of a linear vibration motor according to the third embodiment of the present invention.
Figure 7A:
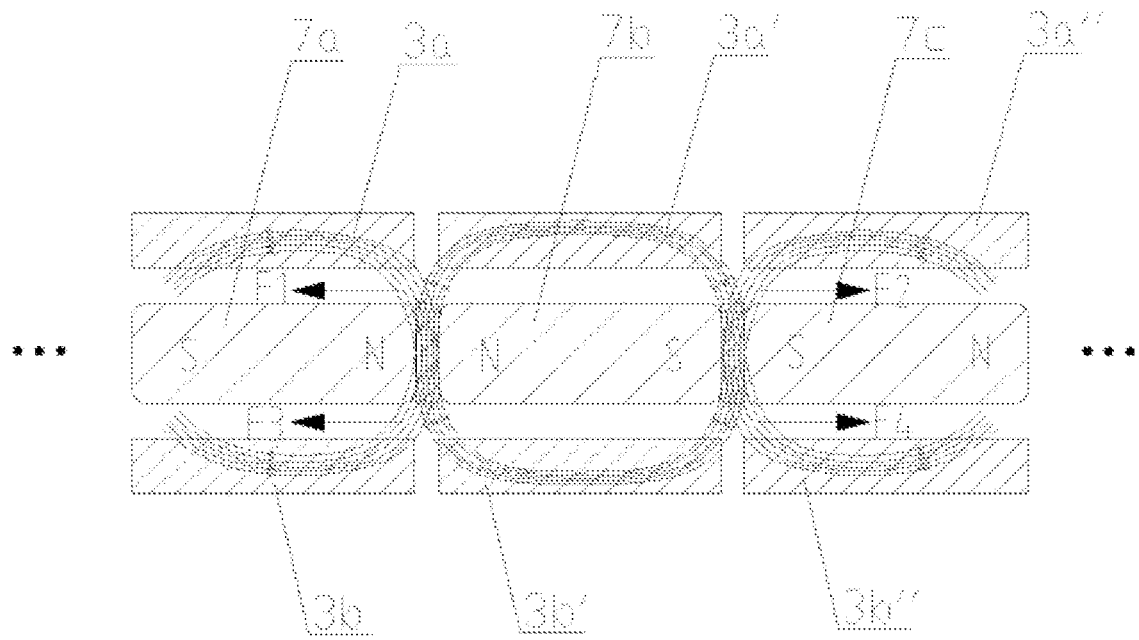
FIG. 7A illustrates a schematic diagram I of the principle of the linear vibration motor according to the third embodiment of the present invention.
Figure 7B:
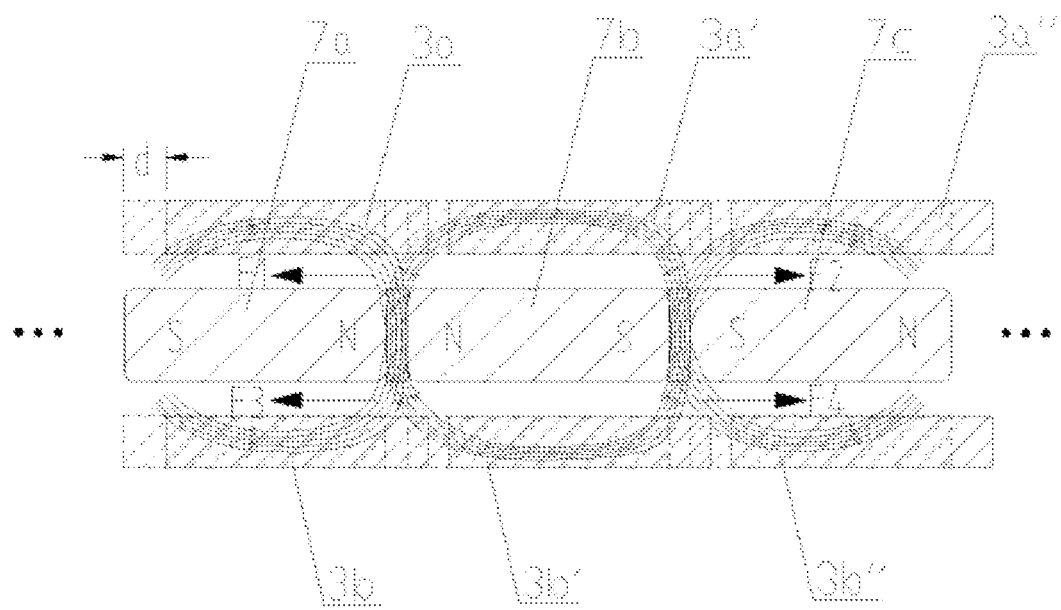
FIG. 7B illustrates a schematic diagram II of the principle of the linear vibration motor according to the third embodiment of the present invention.

FIG. 6 is a sectional structure of a linear vibration motor according to the third embodiment of the present invention; and FIG. 7A and FIG. 7B are the principle and structure of the static state and vibration state of the linear vibration motor according to the third embodiment of the present invention, respectively.

In the third embodiment shown in FIGS. 6 to 7A, in order to increase the magnetic conductivity intensity of the magnetic conductive blocks and increase the vibration amplitude of the vibrator, the magnetic conductive blocks comprise six magnetic conductive blocks, which are disposed symmetrically on the upper side and the lower side of the three adjacent permanent magnets, respectively, that is to say, both of the upper side and the lower side of each permanent magnet of the central vibration block are provided with magnetic conductive blocks.

Wherein the central vibration block comprises a first permanent magnet 7a, a second permanent magnet 7b and a third permanent magnet 7c adjacent to each other, and each of the three permanent magnets disposed adjacent to each other is magnetized horizontally, and polarities of adjacent ends of adjacent permanent magnets are the same; the magnetic conductive blocks comprise six magnetic conductive blocks, which are disposed symmetrically on the upper side and the lower side of the three adjacent permanent magnets, respectively, the magnetic conductive blocks include a first pair of magnetic conductive blocks 3a, 3b on the upper side and the lower side of the first permanent magnet 7a, a second pair of magnetic conductance blocks 3a', 3b' on the upper side and the lower side of the second permanent magnet 7b, and a third pair of magnetic conductive blocks 3a", 3b" on the upper side and the lower side of the third permanent magnet 7c.

In the process of specific application of the present invention, the number of the permanent magnets in the central vibration block can also be increased/reduced according to the actual product needs. For example, more than three permanent magnets constitute the central vibration block in the above manner, and one magnetic conductive block is provided on the upper side and the lower side of each permanent magnet of the central vibration block respectively, to increase the acting force between the magnetic conductive blocks and the vibrator and enhance the vibration sense of the linear vibration motor.

The Fourth Embodiment

Figure 8A:
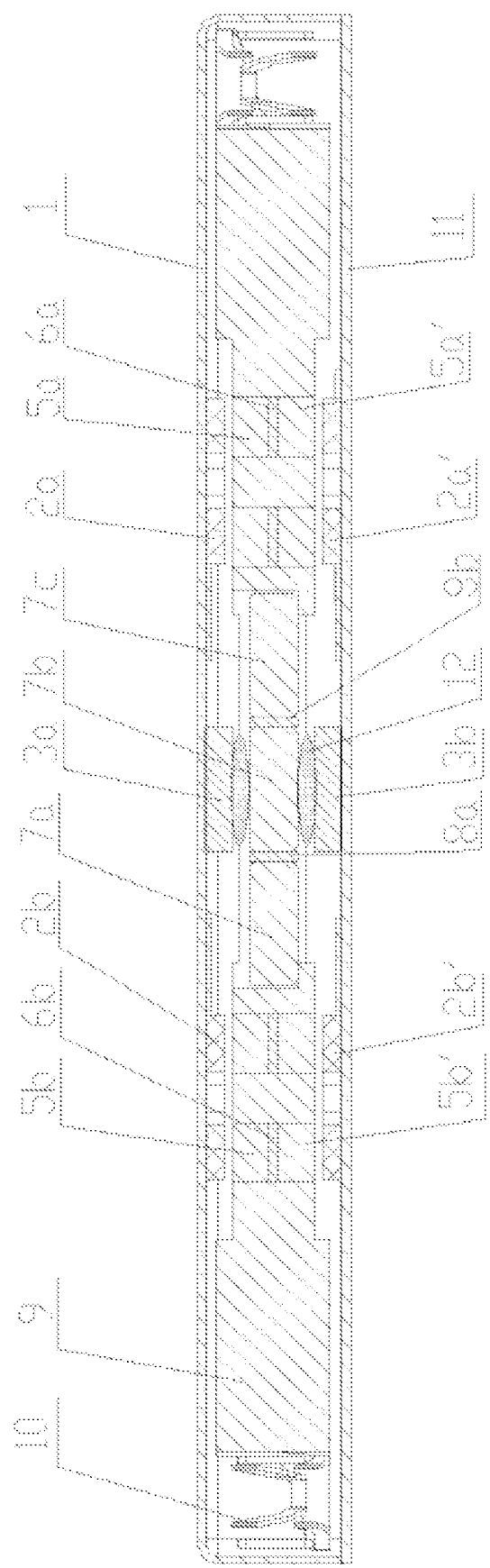
FIG. 8A illustrates a schematic diagram of a sectional structure of a linear vibration motor according to the fourth embodiment of the present invention.
Figure 8B:
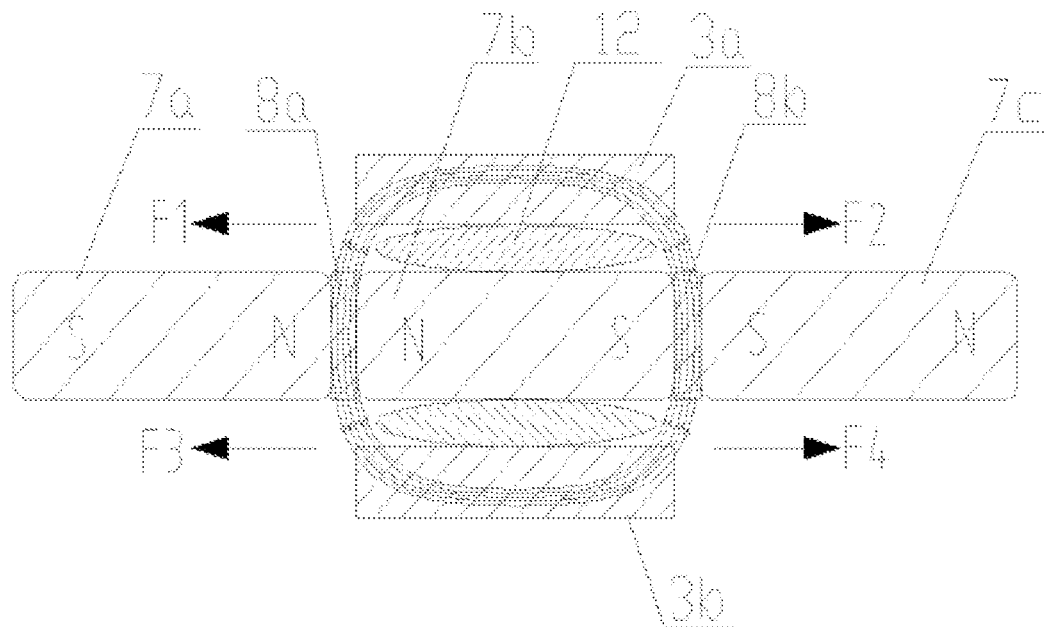
FIG. 8B illustrates a schematic diagram I of the principle of the linear vibration motor according to the fourth embodiment of the present invention.
Figure 8C:
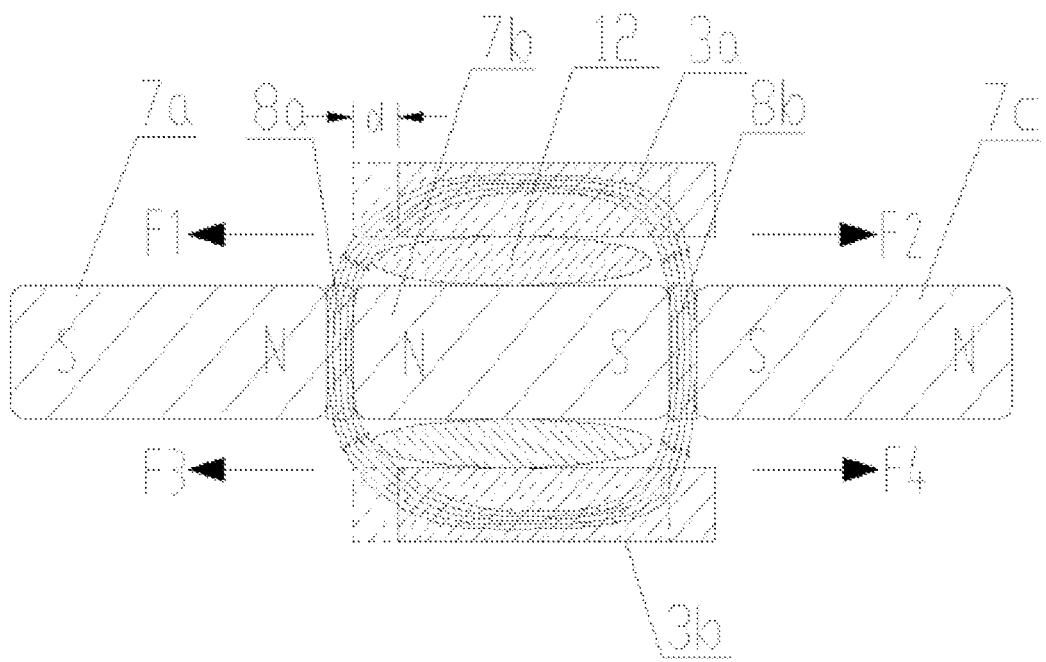
FIG. 8C illustrates a schematic diagram II of the principle of the linear vibration motor according to the fourth embodiment of the present invention.

FIG. 8A is a sectional structure of a linear vibration motor according to the fourth embodiment of the present invention; FIGS. 8B and 8C are the principle and structure of the static state and vibration state of the linear vibration motor according to the fourth embodiment of the present invention, respectively.

In the fourth embodiment shown in FIG. 8A to FIG. 8C, a magnetic gap is formed between the magnetic conductive block and a corresponding permanent magnet of the vibration block, and a magnetic liquid 12 is disposed in the magnetic gap. Wherein a magnetic gap is formed between the vibrator and the magnetic conductive block, and a flexible magnetic conductive member is filled in the magnetic gap, and the flexible magnetic conductive member may be a magnetic liquid 12, wherein the magnetic liquid 12 is a magnetic colloidal substance, which is mainly a uniform and stable colloidal solution formed by uniformly dispersing a surface active agent, in which long-chain is wrapped on the outer layer of the nanoscale magnetic particles (nickel, cobalt, iron oxide, etc.), into base solutions such as water, organic solvent, oil and the like.

Since the magnetic liquid has a certain magnetism, therefore, at the time of assembling, the vibration block and the magnetic conductive blocks corresponding to the vibration block can be assembled in advance, and then the magnetic liquid is injected into the magnetic gap between the permanent magnet and the magnetic conductive block, and the magnetic liquid will actively adsorb to the surface of the permanent magnet due to the magnetism itself, and the magnetic liquid plays a major effect of enhancing the magnetic conductivity intensity between the vibrator and the magnetic block when the vibrator vibrates.

The Fifth Embodiment

Figure 9A:
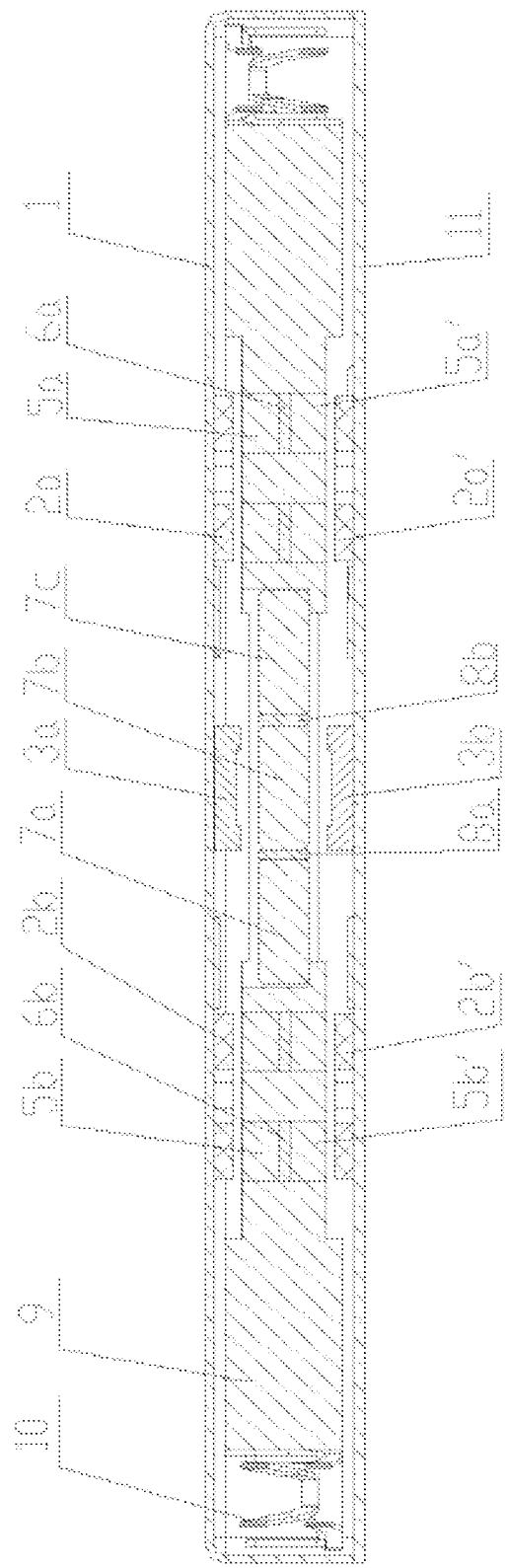
FIG. 9A illustrates a schematic diagram of a sectional structure of a linear vibration motor according to the fifth embodiment of the present invention.
Figure 9B:
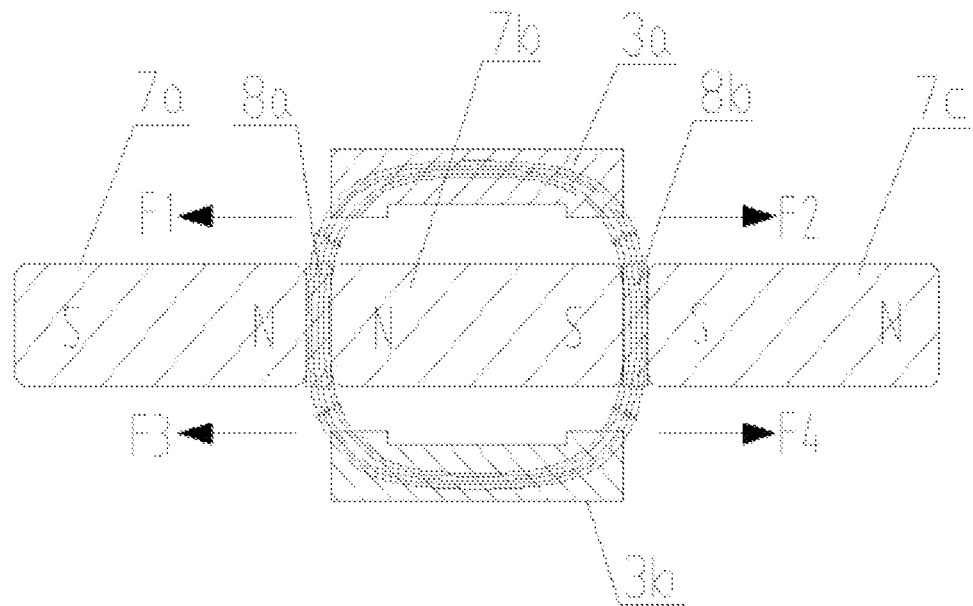
FIG. 9B illustrates a schematic diagram I of the principle of the linear vibration motor according to the fifth embodiment of the present invention.
Figure 9C:
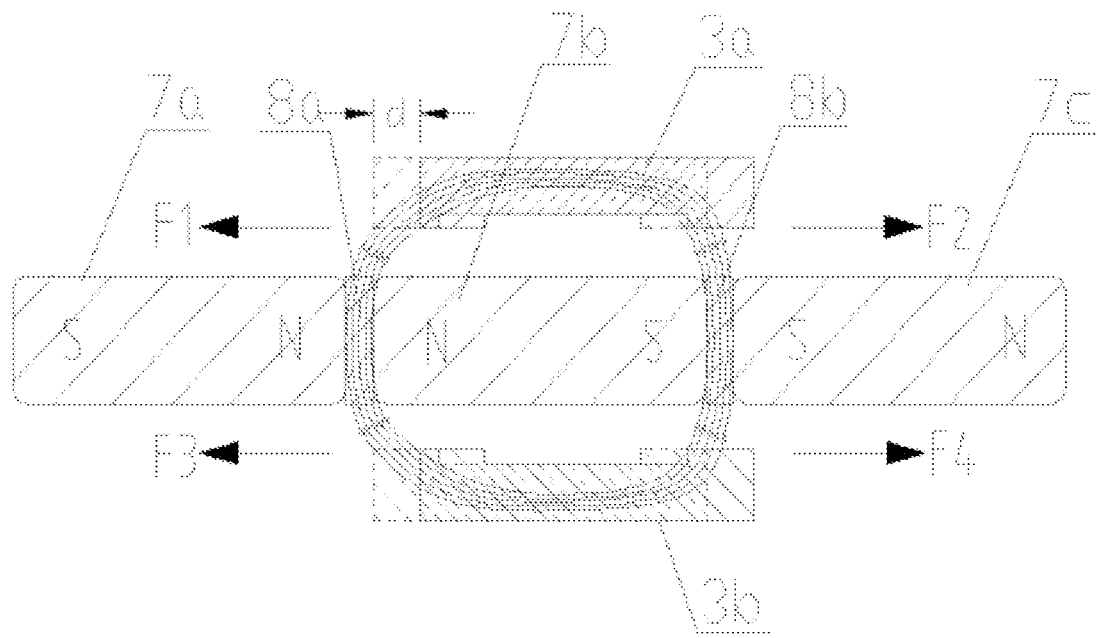
FIG. 9C illustrates a schematic diagram II of the principle of the linear vibration motor according to the fifth embodiment of the present invention.

FIG. 9A illustrates a sectional structure of a linear vibration motor according to the fifth embodiment of the present invention; FIGS. 9B and 9C illustrate the principle and structure of a static state and a vibration state of the linear vibration motor according to the fifth embodiment of the present invention, respectively.

In the fifth embodiment shown in FIGS. 9A to 9C, in order to enhance the magnetic conductivity function of the magnetic conductive block, the magnetic conductive blocks 3a and 3b also can be designed to be heteromorphic structures, such as the U-shaped structure, etc., thereby can make the magnetic flux of the magnetic conductive blocks as large as possible so as to enhance the vibration sense of the linear vibration motor.

Wherein the cross section of the magnetic conductive block shown in FIG. 9A has a U shape (including inverted U shape), and two ends of the magnetic conductive block corresponding to the permanent magnet are provided with extension parts for magnetism gathering.

The vibrator structure in each of the above embodiments takes three permanent magnets as an example, and the structure of one or more permanent magnets is similar to the structure of three permanent magnets and the detailed description thereof is omitted.

It should be noted that, in the above embodiments, an excitation force generating component for the magnetic conductive block also can be provided, the excitation force generating component generates excitation force to agitate the vibrator to vibrate, but not to be limited to this. Specifically, the excitation generating component can be a push-pull structure symmetrically arranged on the left side and the right side of the vibration block. Wherein the push-pull structure includes push-pull magnets 5a, 5a', 5b, 5b' and push-pull coils 2a, 2a', 2b, 2b' provided on one side or upper side and lower side of the push-pull magnets; the vibrator includes a mass block 9, and avoidance structures for avoiding the stator and the push-pull coils are provided in the middle of mass block 9; grooves for accommodating the central vibration block and the push-pull structure are provided in the mass block; and the central vibration block and the push-pull structure can be fixed in the grooves by means of gluing.

Specifically, the middle position of the mass block is provided with a groove matched with the vibrator structure, and the vibrator is fixed in the groove. Two pairs of (four) push-pull magnet fixing grooves are provided at two ends of the groove, and the push-pull magnets are accommodated in the push-pull magnet fixing grooves, wherein two push-pull magnets with upper and lower structures, and magnetic conductive yokes 6a and 6b between the two push-pull magnets are arranged in each of the push-pull magnet fixing grooves. The upper side and lower side of each push-pull magnet fixing groove are provided with corresponding push-pull coils respectively. Wherein the push-pull coil is arranged in parallel with the push-pull magnet, and the magnetic conductive block is subjected to a force by introducing the alternating signal into the push-pull coil, so as to drive the vibration block to vibrate and achieve the vibration of the linear vibration motor. When the vibrator begins to move reciprocally along the vibration direction, it is no need to continuously provide driving force by the push-pull magnet and the push-pull coil during the subsequent vibration process, and the vibrator can vibrate only by means of the interaction force between the magnetic conductive block and the magnet arranged in the vibration block.

It should be noted that the push-pull coil can be symmetrically arranged on one side of the push-pull magnet or symmetrically arranged on the upper side and the lower side of the push-pull magnet. The structure of the push-pull magnet is not limited to the two pairs structure shown in the drawings, and the number and position of the push-pull magnets and push-pull coils in the push-pull structure can be set flexibly according to the needs of the product. For example, a set of push-pull magnets and push-pull coils corresponding to the push-pull magnets are provided on two sides of the grooves for fixing the vibration blocks, respectively, the push-pull coils are provided on one side of the push-pull magnets, or the push-pull coils are provided asymmetrically on the upper side and the lower side of the push-pull magnets, etc., as long as it can provide agitating force for the vibrator.

The linear vibration motor of the present invention further includes a flexible printed circuit board (FPCB) 4 and an elastic support component 10; wherein the flexible printed circuit board 4 is fixedly connected to the housing, and the push-pull coil is connected with the external circuit through a circuit arranged on the flexible printed circuit board 4. The elastic supports 10 are provided at the left end and the right end of the mass block 9, respectively, and the push pull structure is arranged between the elastic support component 10 and the vibration block, and an elastic restoring force is provide for the vibration of the vibrator, by defining the position of the elastic support component 10 and fixing the elastic support component 10 between the vibrator and the housing.

Wherein when the conductive blocks perform a relative displacement relative to the vibrator in the vibration direction of the vibrator, the vibrator moves toward one end of the linear vibration motor until the resultant force of two magnetic forces applied to the vibrator is less than the elastic restoring force of the elastic support at one end of the mass block, thus the vibrator moving towards the opposite direction until the resultant force of two magnetic forces is less than the elastic restoring force of the elastic support at the other end of the mass block, so as to realize the reciprocating motion of the vibrator.

In addition, in the linear vibration motor of the present invention, the mass block can be made of high density metal materials such as tungsten steel block or nickel steel block or nickel tungsten alloy, etc., to increase the vibration force, so as to make the vibration of electronic products more intense.

The linear vibration motor according to the present invention is described by referring to the appended drawings. However, it should be understood for those skilled in the art that various modifications can be made to the linear vibration motor provided by the present invention without departing from the scope of the present invention. Therefore, the protection scope of the present invention should be defined by the appended claims.

The invention claimed is:

1. A linear vibration motor, comprising: a housing, a vibrator, and a stator fixed on the housing and arranged parallel to the vibrator, wherein
   the vibrator comprises a vibration block, and the vibration block comprises at least one permanent magnet, and the stator comprises magnetic conductive blocks; the magnetic conductive blocks are subject to magnetic field forces which are in a same and/or opposite direction of a vibration direction of the vibrator;
   when the vibrator is in a balanced state, a resultant force of the magnetic field forces is zero; and
   when the magnetic conductive blocks are subject to an excitation force to have a relative displacement relative to the vibrator in the vibration direction of the vibrator, a direction of the resultant force of the magnetic field forces is the same as a direction of the relative displacement, and a magnitude of the resultant force of the magnetic field forces has a proportional relationship with a magnitude of the relative displacement.

2. The linear vibration motor according to claim 1, wherein
   the magnetic conductive blocks are distributed symmetrically or asymmetrically on an upper side and a lower side of the vibration block or the magnetic conductive blocks are disposed on one side of the vibration block.

3. The linear vibration motor according to claim 2, wherein
   the vibration block comprises three permanent magnets disposed adjacent to each other, each of the three permanent magnets is magnetized horizontally, and polarities of adjacent ends of adjacent permanent magnets are the same; and
   the magnetic conductive blocks are two magnetic conductive blocks and the two magnetic conductive blocks are disposed symmetrically on the upper side and the lower side of the vibration block; and both of the two magnetic conductive blocks are disposed symmetrically in correspondence to a permanent magnet in the middle of the three permanent magnets of the vibration block.

4. The linear vibration motor according to claim 2, wherein
   the vibration block comprises one permanent magnet, and the magnetic conductive blocks are two magnetic conductive blocks, both of which are disposed on an upper side or a lower side of the vibration block; and
   the two magnetic conductive blocks are distributed in correspondence to a left end and a right end of the permanent magnet respectively, and are disposed symmetrically with respect to a central axis of the permanent magnet.

5. The linear vibration motor according to claim 2, wherein
   the vibration block comprises three permanent magnets disposed adjacent to each other, each of the three permanent magnets is magnetized horizontally, and polarities of adjacent ends of adjacent permanent magnets are the same; and
   the magnetic conductive blocks are six magnetic conductive blocks, and the magnetic conductive blocks are disposed symmetrically on the upper side and the lower side of the three permanent magnets disposed adjacent to each other, respectively.

6. The linear vibration motor according to claim 2, wherein
   the vibration block comprises three permanent magnets disposed adjacent to each other, each of the three permanent magnets is magnetized horizontally, and polarities of adjacent ends of adjacent permanent magnets are the same;
   the magnetic conductive blocks are two magnetic conductive blocks, and the two magnetic conductive blocks are disposed asymmetrically on the upper side and the lower side of the vibration block; and
   the magnetic conductive blocks disposed asymmetrically on the upper side and the lower side of the vibration block are disposed symmetrically with respect to a center of the vibration block.

7. The linear vibration motor according to claim 2, wherein
   a cross section of each of the magnetic conductive blocks has a U shape; and
   two ends of the magnetic conductive blocks corresponding to the permanent magnet are provided with extension parts for magnetism gathering.

8. The linear vibration motor according to claim 1, wherein
   an excitation force applied to the magnetic conductive blocks is generated by an excitation force generating component; and
   the excitation force generating component has a push-pull structure disposed symmetrically on a left side and a right side of the vibration block.

9. The linear vibration motor according to claim 8, wherein further comprising a mass block, and
   the push-pull structure comprises a push-pull magnet, and a voice coil disposed on one side or on an upper side and a lower side of the push-pull magnet; and
   both of the vibration block and the push-pull magnet are disposed in grooves positioned in a middle of the mass block.

10. The linear vibration motor according to claim 1, wherein
    a magnetic gap is formed between the magnetic conductive blocks and a corresponding permanent magnet of the vibration block; and
    magnetic liquid is disposed in the magnetic gap.

* * * * *